US009442940B1

(12) United States Patent
Panchauli et al.

(10) Patent No.: US 9,442,940 B1
(45) Date of Patent: *Sep. 13, 2016

(54) SYSTEMS AND METHODS FOR ADAPTIVELY SELECTING FILE-RECALL MODES

(71) Applicant: Symantec Corporation, Mountain View, CA (US)

(72) Inventors: Mukesh Panchauli, Pune (IN); Laxmikant Gunda, Pune (IN); Hemant Bhanawat, Rajasthan (IN)

(73) Assignee: Veritas Technologies LLC, Mountain View, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/612,831

(22) Filed: Feb. 3, 2015

Related U.S. Application Data

(63) Continuation of application No. 12/752,427, filed on Apr. 1, 2010, now Pat. No. 8,983,910.

(51) Int. Cl.
*G06F 17/30* (2006.01)
*H04L 29/08* (2006.01)
*H04L 29/06* (2006.01)
*G06F 15/16* (2006.01)

(52) U.S. Cl.
CPC ......... *G06F 17/30091* (2013.01); *H04L 67/10* (2013.01); *H04L 67/42* (2013.01)

(58) Field of Classification Search
None
See application file for complete search history.

(56) References Cited

U.S. PATENT DOCUMENTS

| 7,546,432 | B2 | 6/2009 | Stacey et al. |
| 2009/0254917 | A1 | 10/2009 | Ohtani |
| 2009/0287751 | A1 | 11/2009 | Hasegawa et al. |
| 2011/0035409 | A1 | 2/2011 | Shimada et al. |

*Primary Examiner* — Alex Gofman
(74) *Attorney, Agent, or Firm* — ALG Intellectual Property, LLC

(57) ABSTRACT

A computer-implemented method for selecting file-recall modes based on environmental properties may include (1) intercepting a request to recall a file from a secondary storage system to a primary storage system, (2) identifying a value of a dynamic environmental property associated with the file that may negatively impact performance of a mode of recalling the file from the secondary storage system to the primary storage system, (3) identifying a policy that comprises criteria for selecting an appropriate recall mode for recalling the file from the secondary storage system to the primary storage system, (4) adaptively selecting, by applying the policy to the value of the dynamic environmental property, a recall mode for recalling the file, and (5) recalling the file from the secondary storage system to the primary storage system using the selected recall mode. Various additional methods, systems, and configured computer-readable-storage media are also disclosed.

20 Claims, 6 Drawing Sheets

File Properties
124

```
--------------------------------------------------------------------------
**************************************************************
filename: doc.txt
size: 56KB
recall_total: 7
recall_1: pass-through recall @ 14:45:01 on 12/01/2009
recall_2: pass-through recall @ 01:12:23 on 12/03/2009
recall_3: pass-through recall @ 03:20:43 on 12/04/2009
recall_4: pass-through recall @ 11:32:56 on 12/05/2009
recall_5: pass-through recall @ 16:28:43 on 12/05/2009
recall_6: pass-through recall @ 21:31:15 on 12/05/2009
recall_7: pass-through recall @ 04:25:09 on 12/06/2009
**************************************************************
filename: video.mp4
size: 12.12GB
recall_total: 0
**************************************************************
filename: email.html
size: 27KB
recall_total: 1
recall_1: full recall @ 11:21:43 on 01/12/2010
**************************************************************
filename: ssheet.xls
size: 112KB
recall_total: 11
recall_1: partial recall @ 14:45:01 on 12/23/2009
recall_2: partial recall @ 14:45:01 on 12/27/2009
recall_3: partial recall @ 14:45:01 on 01/03/2010
recall_4: partial recall @ 14:45:01 on 01/04/2010
recall_5: partial recall @ 14:45:01 on 01/09/2010
recall_6: partial recall @ 14:45:01 on 01/14/2010
recall_7: partial recall @ 14:45:01 on 01/22/2010
recall_8: partial recall @ 14:45:01 on 02/03/2010
recall_9: partial recall @ 14:45:01 on 02/11/2010
recall_10: partial recall @ 14:45:01 on 02/15/2010
recall_11: partial recall @ 14:45:01 on 02/19/2010
**************************************************************
```

*FIG. 4*

SYSTEMS AND METHODS FOR ADAPTIVELY SELECTING FILE-RECALL MODES

CROSS REFERENCE TO RELATED APPLICATION

This application is a continuation of U.S. application Ser. No. 12/752,427, filed 1 Apr. 2010, the disclosure of which is incorporated, by this reference, in its entirety.

BACKGROUND

Some storage management systems (such as archiving systems and hierarchical storage management systems) may copy files from a primary storage device to a secondary storage device in order to conserve storage resources on the primary storage device. For example, an email archiving system may archive emails on a computing system that are more than a year old in order to free up storage space occupied by these emails on the computing system. Similarly, a hierarchical storage management system may copy files from a fast (but expensive) storage device to a cheaper (but slower) storage device in order to conserve storage resources on the more expensive storage device.

When a user or application attempts access to a file that has been moved to a secondary storage device by a storage management system, the storage management system may recall the file from the secondary storage device using one of three typical recall modes: 1) full recall (in which the complete file is downloaded from the secondary storage device and stored on the primary storage device), 2) partial recall (in which specific chunks of the file are downloaded from the secondary storage device to the primary storage device), and 3) pass-through recall (in which the file is downloaded and provided to a requesting application directly without storing the file on the primary storage device). Conventional storage management systems typically statically assign recall modes to volumes or devices. For example, a storage management system may specify that a particular storage device recall all files in full recall mode.

The static assignment of a recall mode to a volume or device may result in a number of problems and/or inefficiencies. For example, if a storage device attempts to perform multiple simultaneous recalls in full recall mode, then one or more of these recalls may fail if the storage and/or I/O capacity of the storage device is exceeded. Similarly, if a storage device attempts to recall a large file in partial recall mode, then completion of the recall operation may be unnecessarily delayed due to the large number of round trips that may be required to recall the various chunks of the file from the secondary storage device. In addition, if a storage device attempts to recall a file in pass-through recall mode multiple times within a short period of time, then disk I/O and/or network load may be unnecessarily increased.

SUMMARY

As will be described in greater detail below, the instant disclosure generally relates to systems and methods for adaptively selecting file-recall modes for recalling files. In one example, the systems described herein may accomplish such a task by: 1) identifying (by, e.g., intercepting via a filter driver) a request to recall a file from a secondary storage system, 2) identifying at least one environmental property associated with the file (such as a property or characteristic of the file itself, of a secondary storage system on which the file is stored, of a primary storage system to which the file is to be recalled, and/or of a network through which the file will be recalled), 3) selecting, based at least in part on the identified environmental property, a recall mode (e.g., full, partial, or pass-through) for recalling the file, and then 4) recalling the file from the secondary storage system using the selected recall mode.

As will be explained in greater detail below, by adaptively selecting a recall mode for recalling a file based at least in part on one or more properties of the file and/or its associated computing environment, the systems and methods described herein may effectively manage and/or improve the performance of file-recall operations. As such, these systems and methods may avoid recall failures and/or degraded system performance.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a diagram of exemplary file properties that may be considered when selecting a recall mode for recalling a file.

Figure 1:
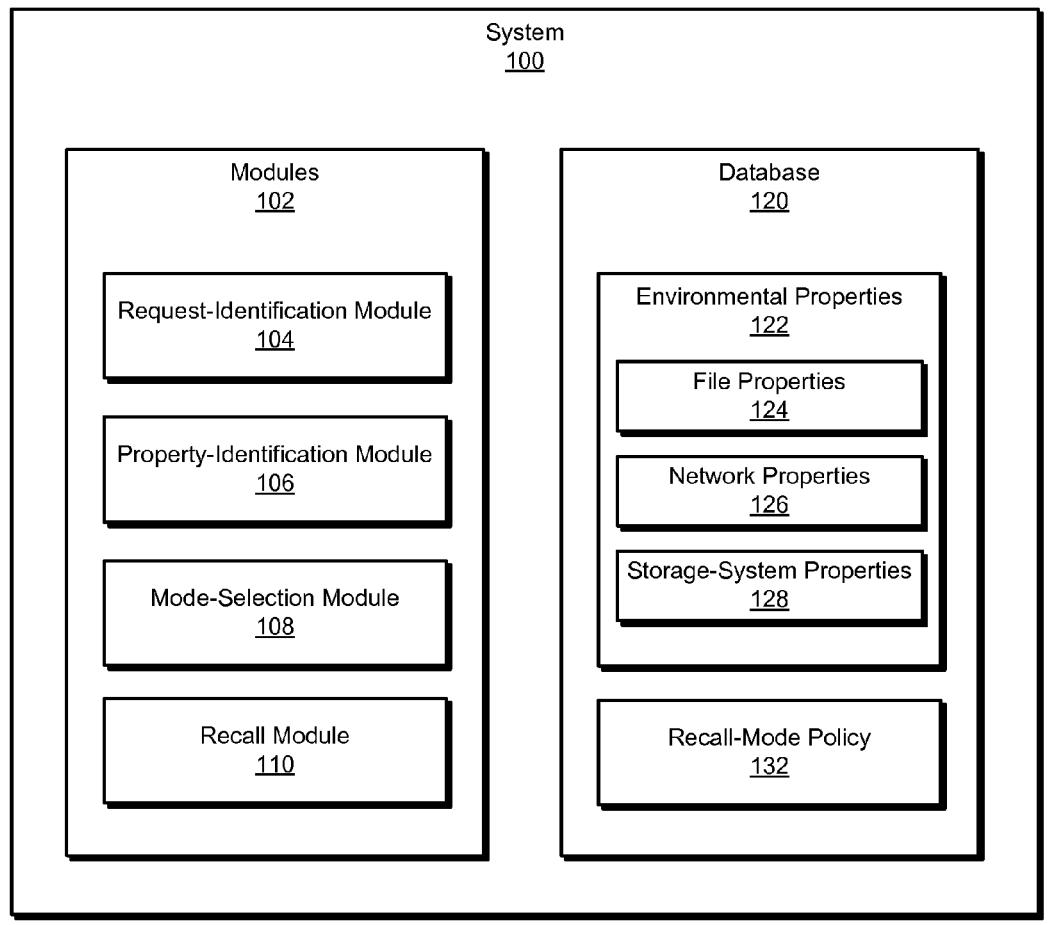
FIG. 1 is a block diagram of an exemplary system for adaptively selecting file-recall modes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
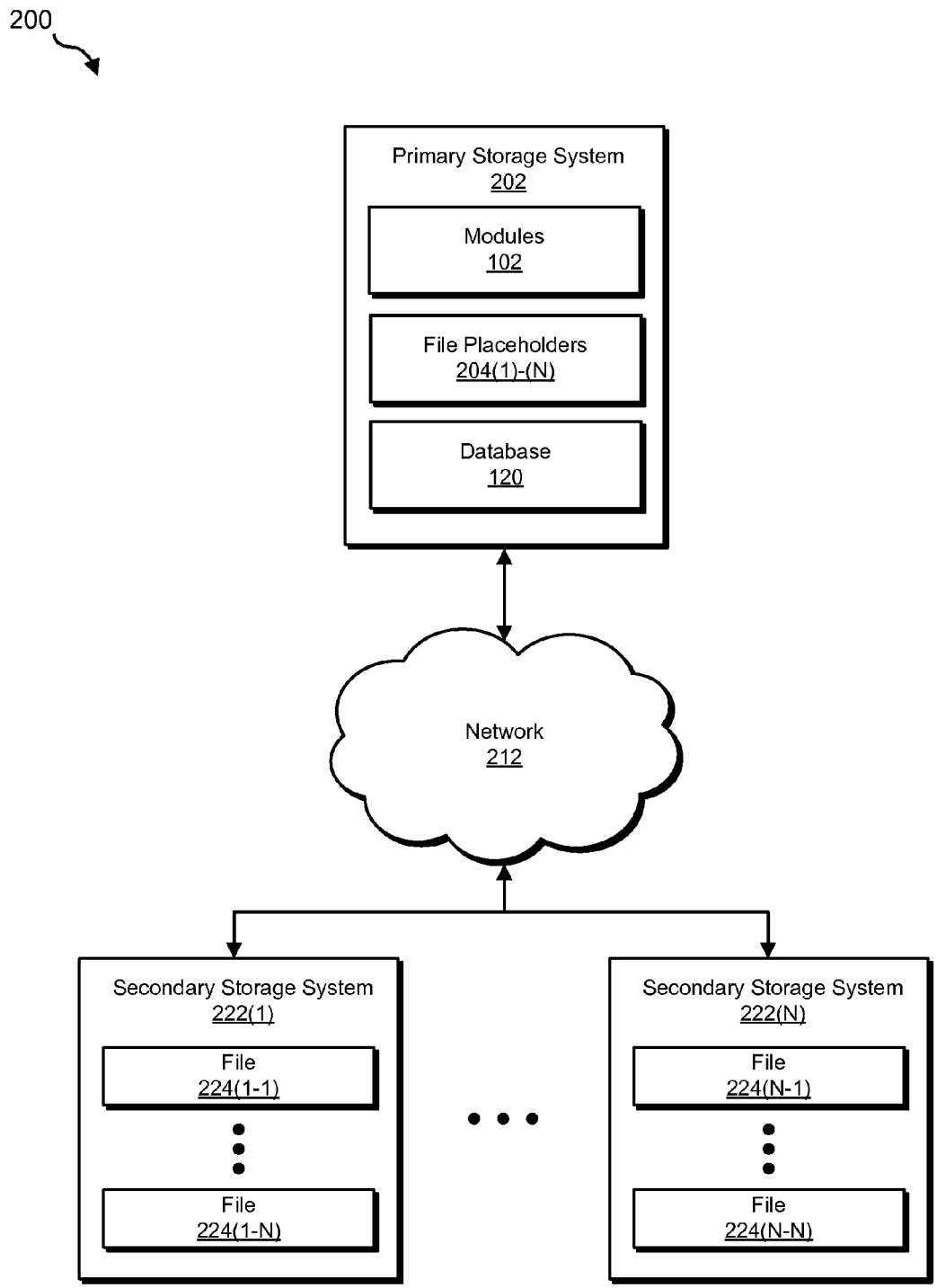
FIG. 2 is a block diagram of an exemplary system for adaptively selecting file-recall modes.

The following will provide, with reference to FIGS. 1-2, detailed descriptions of exemplary systems for adaptively selecting file-recall modes for recalling files. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for adaptively selecting file-recall modes to be used when recalling files. As illustrated in this figure, exemplary system 100 may include one or more modules 102 for performing one or more tasks. For example, and as will be explained in greater detail below, exemplary system 100 may include a request-identification module 104 programmed to identify a request to recall a file from a secondary storage system to a primary storage system. Exemplary system 100 may also include a property-identification module 106 programmed to identify at least one environmental property associated with the file (such as a property of the file, of a secondary storage system on which the file is stored, of a primary storage system to which the file is to be recalled, and/or of a network through which the file is to be recalled).

In addition, and as will be described in greater detail below, exemplary system 100 may include a mode-selection module 108 programmed to select a recall mode for recalling the file in question based at least in part on the identified environmental property. Exemplary system 100 may also include a recall module 110 programmed to recall the file from the secondary storage system to the primary storage system using the selected recall mode. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent application or system software modules stored and configured to run on one or more computing devices, such as the devices illustrated in FIG. 2 (e.g., primary storage system 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may contain one or more environmental properties 122 that may be evaluated when selecting a recall mode for recalling a file. As illustrated in FIG. 1, environmental properties 122 may include the properties of one or more files to be recalled (file properties 124), the properties of a network through which a file is to be recalled (network properties 126), and/or the properties of a storage system on which a file is stored and/or to which a file is to be recalled (storage-system properties 128).

In some examples, database 120 may also include a recall-mode policy 132. As will be explained in greater detail below, in some examples recall-mode policy 132 may specify, and/or contain various criteria for selecting, a recall mode for recalling a file.

Database 120 may represent portions of a single database or computing device or a plurality of databases or computing devices. For example, database 120 may represent a portion of primary storage system 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as primary storage system 202 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include a primary storage system 202 in communication with one or more secondary storage systems 222(1)-(N) via a network 212. In one embodiment, and as will be described in greater detail below, modules 102 may program primary storage system 202 to: 1) identify (by, e.g., intercepting) a request to recall a file from a secondary storage system (e.g., one of secondary storage systems 222(1)-(N)) to a primary storage system (e.g., primary storage system 202), 2) identify at least one environmental property associated with the file (such as a property of the file, secondary storage systems 222(1)-(N), primary storage system 202, and/or network 212), 3) select, based at least in part on the identified environmental property, a recall mode (e.g., full, partial, or pass-through) for recalling the file, and then 4) recall the file from the secondary storage system to the primary storage system using the selected recall mode.

Storage systems 202 and 222(1)-(N) generally represent any type or form of storage device or system capable of storing and/or managing data. In some examples, storage systems 202 and 222(1)-(N) may represent portions of a data-archiving system (such as SYMANTEC's ENTERPRISE VAULT) and/or a hierarchical management system (such as VERITAS FILE SYSTEM).

Network 212 generally represents any medium or architecture capable of facilitating communication or data transfer. Examples of network 212 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 212 may facilitate communication or data transfer using wireless or wired connections. In one embodiment, network 212 may facilitate communication between primary storage system 202 and secondary storage systems 222(1)-(N).

Figure 3:
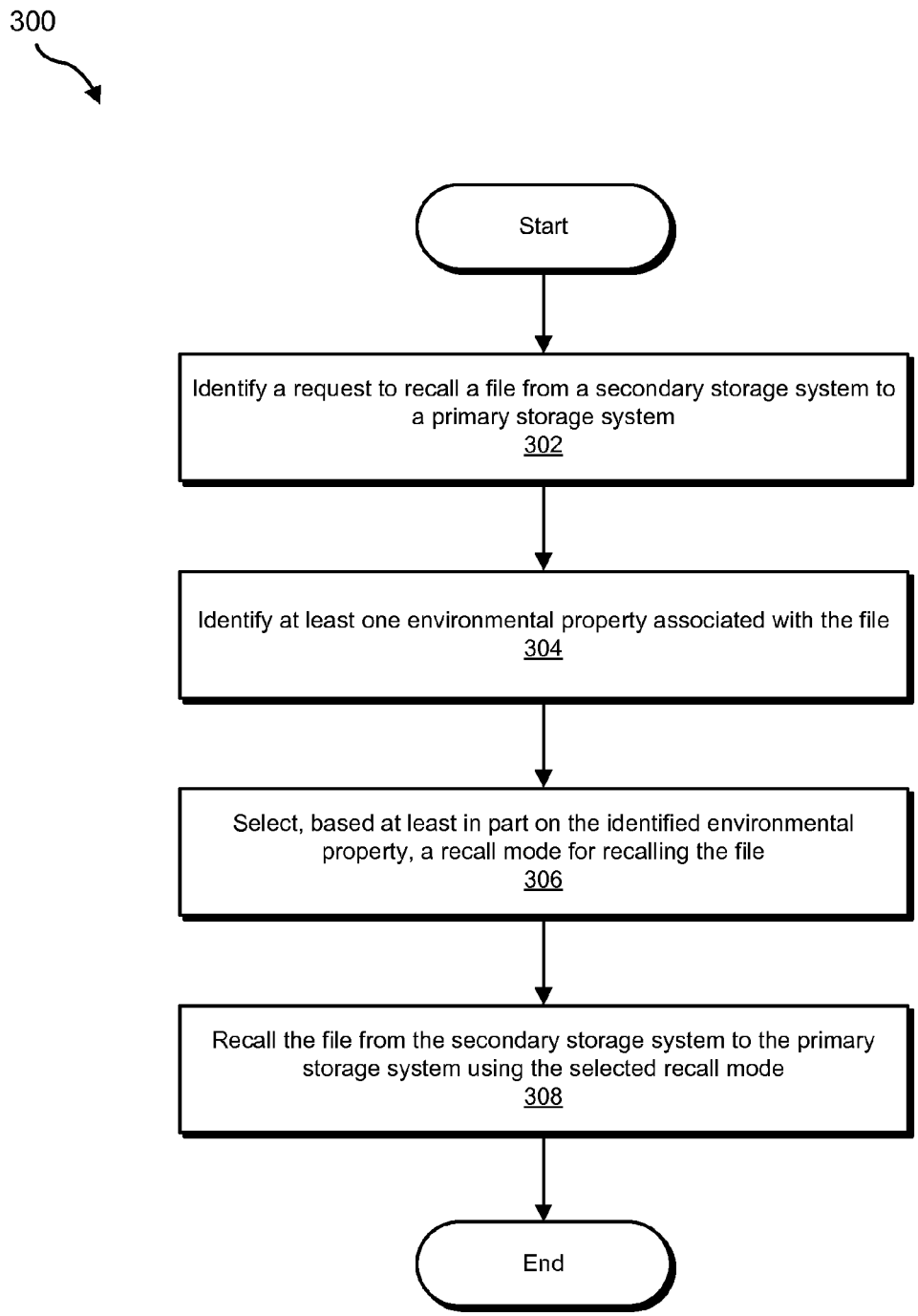
FIG. 3 is a flow diagram of an exemplary method for adaptively selecting file-recall modes.

FIG. 3 is a flow diagram of an exemplary computer-implemented method 300 for adaptively selecting file-recall modes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the various systems described herein may identify a request to recall a file from a secondary storage system to a primary storage system. For example, request-identification module 104 in FIG. 1 may, as part of primary storage system 202 in FIG. 2, identify a request to recall a file stored on one of secondary storage systems 222(1)-(N).

The systems described herein may perform step 302 in a variety of ways and in a variety of contexts. In one example, request-identification module 104 may perform step 302 by intercepting a request to recall a file from a secondary storage system. For example, request-identification module 104 may (e.g., as part of a filter driver on primary storage system 202) intercept a request from an application to recall a file referenced by one of file placeholders 204(1)-(N) on primary storage system 202.

A "file placeholder" (such as file placeholders 204(1)-(N)) may represent a shortcut, link, stub, or reference to a file stored on a secondary storage system, such as secondary storage systems 222(1)-(N) in FIG. 2. For example, an archiving system (such as an email archiving system) may copy a file from a primary storage system to a secondary storage system in order to conserve storage resources on the primary storage system. In this example, the primary storage system may replace the file in question with a placeholder that references or points to an archived instance of the file on the secondary storage system. Similarly, a hierarchical storage management system may copy a file from a fast (but expensive) primary storage device to a less-expensive (but slower) secondary storage device in order to conserve storage resources on the primary storage device. As with the archiving system, the hierarchical storage management system may replace the copy of the file on the primary storage device with a placeholder that references or points to the full copy of the file on the secondary storage device.

Returning to FIG. 3, at step 304 the systems described herein may identify at least one environmental property associated with the file to which the recall request identified in step 302 is directed. For example, property-identification module 106 in FIG. 1 may, as part of primary storage system 202 in FIG. 2, identify at least one environmental property associated with a file to be recalled from one of secondary storage systems 222(1)-(N).

An "environmental property," as used herein, may refer to a property or characteristic of a file and/or its associated computing environment. For example, an environmental property may include a property of a file, a property of a secondary storage system on which the file is stored, a property of a primary storage system to which the file is to be recalled, and/or a property of a computing network through which the file is to be recalled.

Examples of suitable file properties include, without limitation, the size of a file, the file type of a file (e.g., .doc, .txt, .html, or the like), the number of times a file has been previously recalled, the number of times a file has been recalled within a predetermined period of time (e.g., the number of times a file has been recalled within the last two days), the number of times a file has been recalled using a particular recall mode (e.g., the number of times a file has been recalled in full-recall, partial recall, and/or pass-through recall mode, as will be explained in greater detail below), the number of simultaneous recall requests currently directed to a file, and/or any other property or characteristic of a file.

Similarly, examples of suitable storage system properties include, without limitation, the current or projected storage capacity of a primary or secondary storage system (such as primary storage system 202 and secondary storage systems 222(1)-(N) in FIG. 2), the current or projected I/O load on a primary or secondary storage system, and/or any other characteristic or property of a storage system. In addition, examples of suitable network properties include, without limitation, the speed of, current bandwidth capacity of, projected bandwidth capacity for, and/or any other property or characteristic of a network (e.g., network 212 in FIG. 2) through which a file may be recalled.

The systems described herein may perform step 304 in a variety of ways and in a variety of contexts. In one example, property-identification module 106 may identify an environmental property associated with a file at step 304 by directly analyzing the file and/or its associated computing environment. In another example, property-identification module 106 may identify an environmental property associated with a file by retrieving the property from a database, such as database 120 in FIG. 1. As explained above, database 120 may contain one or more previously gathered or identified environmental properties 122 associated with one or more files.

Returning to FIG. 3, at step 306 the systems described herein may select a recall mode for recalling the file based at least in part on the environmental property identified in step 304. For example, mode-selection module 108 in FIG. 1 may, as part of primary storage system 202 in FIG. 2, select, based at least in part on the environmental property identified in step 304, a recall mode for recalling the file to which the recall request identified in step 302 is directed.

The phrase "recall mode," as used herein, may refer to a specific type or form of recall operation that may be performed on a file. Examples of recall modes include, without limitation, full recall modes (in which a complete file is downloaded from a secondary storage system and stored on a primary storage system), partial recall modes (in which portions or chunks of a file are downloaded from a secondary storage system and stored on a primary storage system), and pass-through recall modes (in which a file is downloaded from a secondary storage system and provided to a requesting application directly without storing a copy of the file on a primary storage system).

The systems described herein may select a recall mode for recalling a file in step 306 in a variety of ways and in a variety of contexts. In one example, mode-selection module 108 in FIG. 1 may select a recall mode for recalling a file by applying various criteria to the file and/or its associated computing environment. For example, mode-selection module 108 may apply recall-mode policy 132 to a file and/or its associated computing environment (such as a secondary storage system on which the file resides, a primary storage system to which the file is to be recalled, and/or a network through which the file is to be recalled). As explained above, recall-mode policy 132 may specify, and/or contain various criteria for selecting, a recall mode for recalling a file. For example, recall-mode policy 132 may specify that a file should be recalled using a particular recall mode (e.g., full, partial, or pass-through) if the file and/or its associated computing environment satisfy specific criteria.

As detailed above, recall-mode policy 132 may contain any number or combination of criteria for selecting a recall mode for recalling a file. For example, recall-mode policy 132 may specify that files that are smaller than a specific file size (e.g., files that are less than 1 MB in size) should be recalled in full recall mode. For example, mode-selection module 108 may recall the file "email.html" identified in FIG. 4 in full recall mode since this file is less than 1 MB in size.

In another example, recall-mode policy 132 may specify that files that are larger than a specific file size (e.g., files that are larger than 500 MB in size) should be recalled in partial recall mode unless the current or projected storage capacity of a primary storage system on which the file is to be stored is less than a predetermined amount, in which case the file should be recalled in pass-through recall mode. In an additional example, recall-mode policy 132 may specify that media files (e.g., files of a specific file type, such as .mp4, .avi, or the like) that are larger than a specific file size (e.g., files that are larger than 1 GB in size) should be recalled in pass-through recall mode in order to conserve storage space on the primary storage system. For example, mode-selection module 108 may recall the media file "video.mp4" identified in FIG. 4 in pass-through recall mode since this file is greater than 1 GB in size.

In another example, recall-mode policy 132 may specify that files that have been previously recalled more than a predetermined number of times (e.g., files that have been recalled more than 50 times) should be recalled in full recall mode. Similarly, recall-mode policy 132 may specify that files that have been previously recalled more than a predetermined number of times using a particular recall mode (e.g., files that have been previously recalled more than 10 times in partial recall mode) should be recalled in full recall mode. For example, mode-selection module 108 may recall the file "ssheet.xls" identified in FIG. 4 in full recall mode since this file has been recalled more than 10 times in partial recall mode.

In another example, recall-mode policy 132 may specify recalling a file in partial recall mode if the primary storage system has received more than a predetermined number of simultaneous recall requests (either for the file in question or one or more additional files). In an additional example, recall-mode policy 132 may specify using a partial recall mode to recall a file if the current or projected bandwidth capacity of a network (such as network 212 in FIG. 2) through which the file is to be recalled is less than a predetermined amount. Recall-mode policy 132 may also specify using a pass-through recall mode to recall file if the current or projected I/O load on a primary storage system (such as primary storage system 202 in FIG. 2) to which the file is to be recalled is less than a predetermined amount.

Returning to FIG. 3, at step 308 the systems described herein may recall the file from the secondary storage system using the selected recall mode. For example, recall module 110 in FIG. 1 may, as part of primary storage system 202 in FIG. 2, recall a file from one of secondary storage systems 222(1)-(N) using the recall mode (e.g., full, partial, or pass-through) selected in step 306. Upon completion of step 308, exemplary method 300 in FIG. 3 may terminate.

As detailed above, by adaptively selecting a recall mode for recalling a file based at least in part on one or more properties of the file and/or its associated computing environment, the systems and methods described herein may effectively manage and/or improve the performance of file-recall operations. As such, these systems and methods may avoid recall failures and/or degraded system performance.

Figure 5:
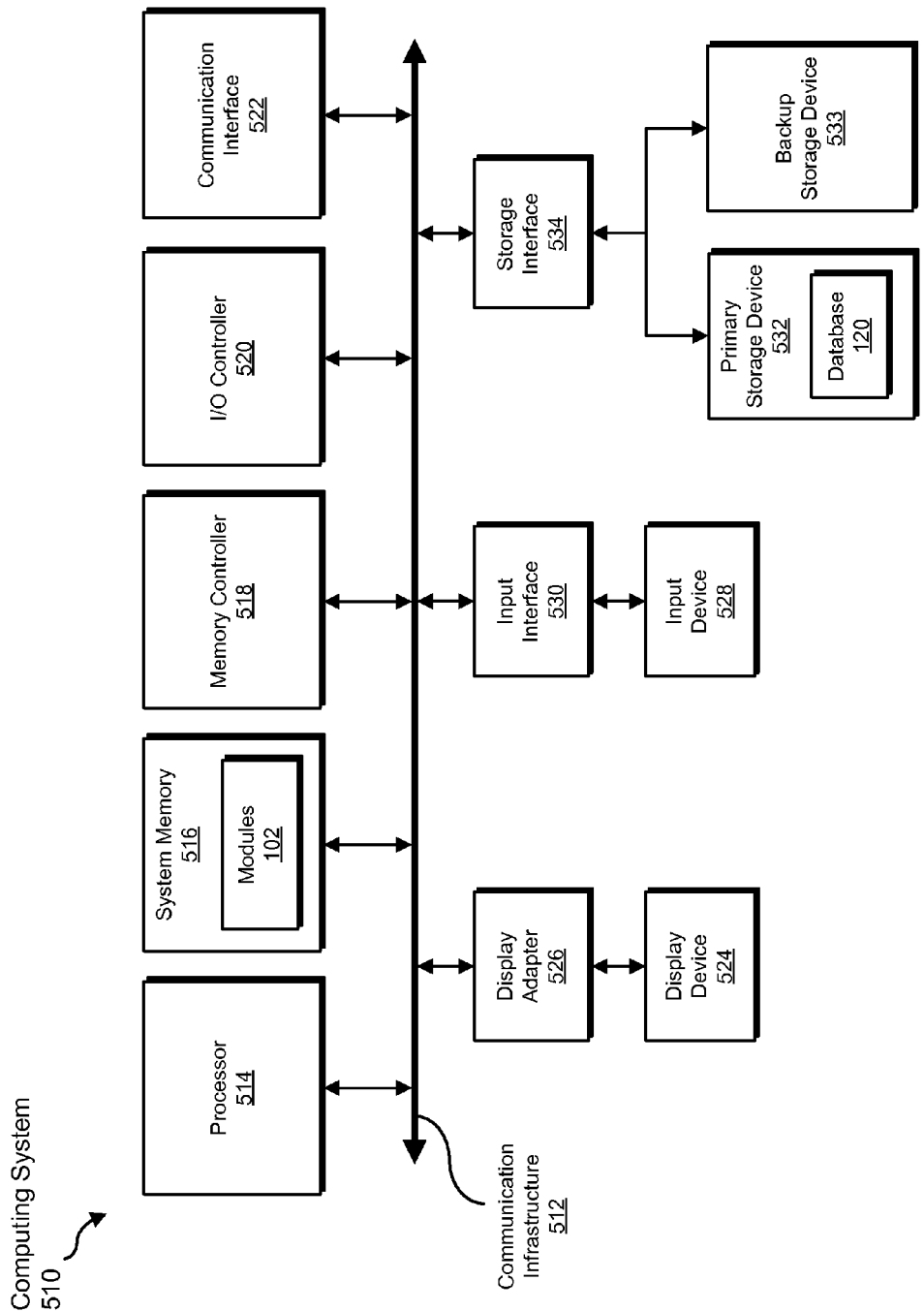
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, selecting, recalling, and/or intercepting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, selecting, recalling, and/or intercepting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, selecting, recalling, and/or intercepting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, selecting, recalling, and/or intercepting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, selecting, recalling, and/or intercepting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, selecting, recalling, and/or intercepting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
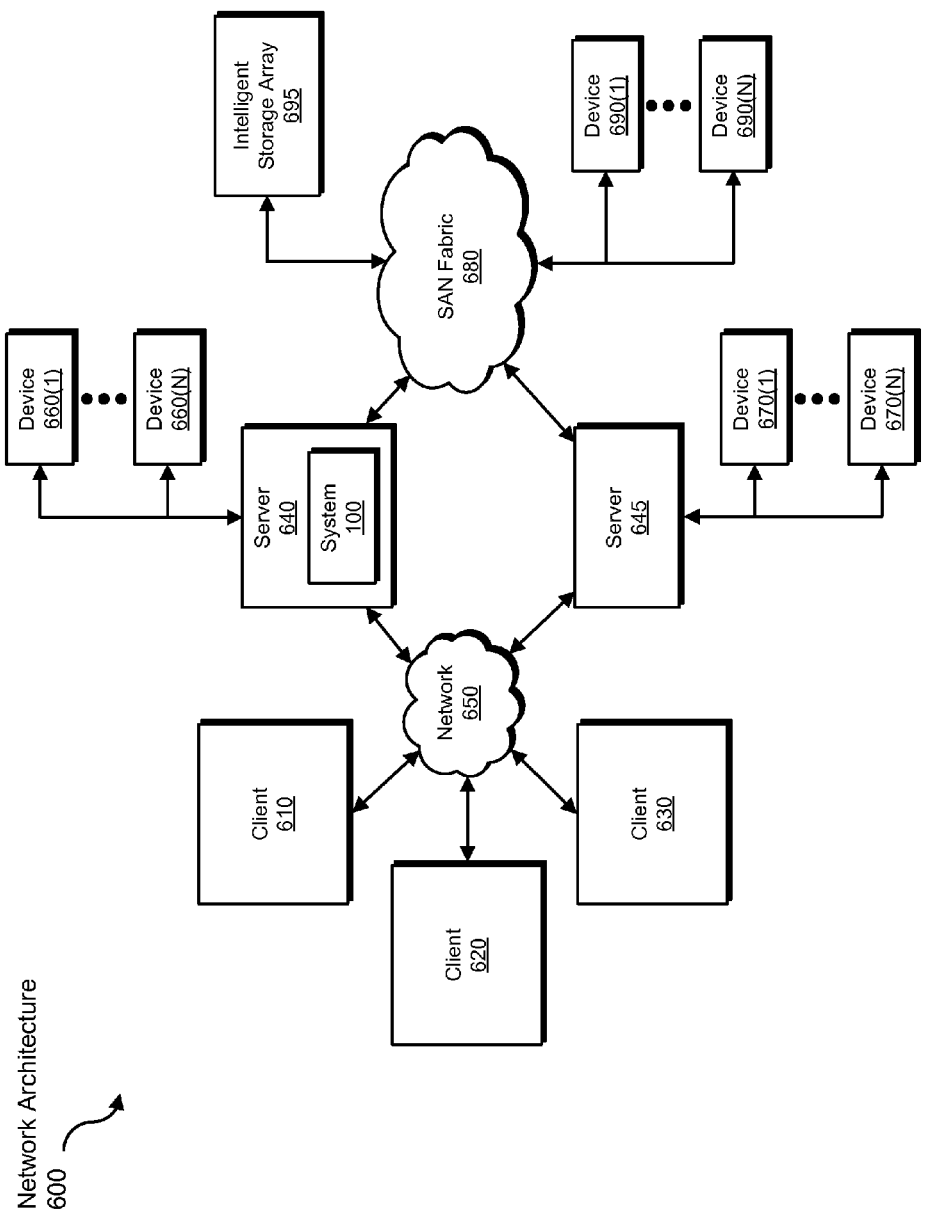
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, selecting, recalling, and/or intercepting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for adaptively selecting file-recall modes. In one example, such a method may include: 1) identifying a request to recall a file from a secondary storage system to a primary storage system, 2) identifying at least one environmental property associated with the file, 3) selecting, based at least in part on the identified environmental property, a recall mode for recalling the file, and then 4) recalling the file from the secondary storage system to the primary storage system using the selected recall mode. In some examples, identifying the request to recall the file may include intercepting the request to recall the file.

Examples of environmental properties include a property of a file, a property of a primary storage system, a property of a secondary storage system, and/or a property of a computing network through which the file will be recalled. Examples of file properties include the size of a file, the file type of a file, the number of times a file has been recalled, the number of times a file has been recalled within a predetermined period of time, the number of times a file has been recalled using a particular recall mode, and/or the number of simultaneous recall requests that are currently directed to a file.

In addition, examples of computing-network properties include the speed of a network, the current bandwidth capacity of a network, and/or the projected bandwidth capacity of a network. Similarly, examples of storage-system properties include the current storage capacity of a storage system, the projected storage capacity of a storage system, the current I/O load on a storage system, and/or the projected I/O load of a storage system.

In some examples, the recall mode may represent a full recall mode, a partial recall mode, or a pass-through recall mode. In addition, in some examples the primary storage system and the secondary storage system may represent portions of a data-archiving system and/or a hierarchical storage management system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a traditional storage management system into a storage management system capable of adaptively selecting recall modes for recalling a file based on one or more properties of the file and/or its associated computing environment.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for adaptively selecting file-recall modes, at least a portion of the method being performed by a computing device comprising at least one processor, the method comprising:
   intercepting a request to recall a file from a secondary storage system to a primary storage system;
   identifying a value of at least one dynamic environmental property associated with the file that may negatively impact performance of at least one mode of recalling the file from the secondary storage system to the primary storage system by negatively impacting at least one of:
      load on the primary storage system;
      load on the secondary storage system;
      network load on a network through which the file will be recalled;
   identifying at least one policy that comprises criteria for selecting, from among a plurality of different recall modes based on the value of the dynamic environmental property, an appropriate recall mode for recalling the file from the secondary storage system to the primary storage system, the plurality of different recall modes comprising at least two of:
      a full recall mode;
      a partial recall mode;
      a pass-through recall mode;
   adaptively selecting, at least in part by applying the policy to the value of the dynamic environmental property, a recall mode for recalling the file from the secondary storage system to the primary storage system;
   recalling the file from the secondary storage system to the primary storage system using the selected recall mode.

2. The method of claim 1, wherein the value of the dynamic environmental property comprises a projected value of the dynamic environmental property.

3. The method of claim 1, wherein the dynamic environmental property associated with the file comprises at least one of:
   a property of the file;
   a property of the primary storage system;
   a property of the secondary storage system;
   a property of the network through which the file will be recalled.

4. The method of claim 3, wherein the property of the file comprises at least one of:
   the size of the file;
   the file's file type;
   the number of times the file has been recalled;
   the number of times the file has been recalled within a predetermined period of time;
   the number of times the file has been recalled using a particular recall mode;
   the number of simultaneous recall requests that are currently directed to the file.

5. The method of claim 3, wherein the property of the network comprises at least one of:
   the speed of the network;
   the current bandwidth capacity of the network;
   a projected bandwidth capacity for the network.

6. The method of claim 3, wherein the property of the primary storage system comprises at least one of:
   the current storage capacity of the primary storage system;
   a projected storage capacity for the primary storage system;
   the current I/O load on the primary storage system;
   a projected I/O load for the primary storage system.

7. The method of claim 1, wherein the plurality of different recall modes comprise:
   the full recall mode;
   the partial recall mode;
   the pass-through recall mode.

8. The method of claim 1, wherein the primary storage system and the secondary storage system comprise portions of at least one of:
   a data-archiving system;
   a hierarchical storage management system.

9. A system for adaptively selecting file-recall modes, the system comprising:
- a request-identification module programmed to intercept a request to recall a file from a secondary storage system to a primary storage system;
- a property-identification module and a mode-selection module programmed to perform the following:
  - identify a value of at least one dynamic environmental property associated with the file that may negatively impact performance of at least one mode of recalling the file from the secondary storage system to the primary storage system by negatively impacting at least one of:
    - load on the primary storage system;
    - load on the secondary storage system;
    - network load on a network through which the file will be recalled;
  - identify at least one policy that comprises criteria for selecting, from among a plurality of different recall modes based on the value of the dynamic environmental property, an appropriate recall mode for recalling the file from the secondary storage system to the primary storage system, the plurality of different recall modes comprising at least two of:
    - a full recall mode;
    - a partial recall mode;
    - a pass-through recall mode;
  - adaptively select, at least in part by applying the policy to the value of the dynamic environmental property, a recall mode for recalling the file from the secondary storage system to the primary storage system;
- a recall module programmed to recall the file from the secondary storage system to the primary storage system using the selected recall mode;
- at least one processor configured to execute the request-identification module, the property-identification module, the mode-selection module, and the recall module.

10. The system of claim 9, wherein the value of the dynamic environmental property comprises a projected value of the dynamic environmental property.

11. The system of claim 9, wherein the dynamic environmental property associated with the file comprises at least one of:
- a property of the file;
- a property of the primary storage system;
- a property of the secondary storage system;
- a property of the network through which the file will be recalled.

12. The system of claim 11, wherein the property of the file comprises at least one of:
- the size of the file;
- the file's file type;
- the number of times the file has been recalled;
- the number of times the file has been recalled within a predetermined period of time;
- the number of times the file has been recalled using a particular recall mode;
- the number of simultaneous recall requests that are currently directed to the file.

13. The system of claim 11, wherein the property of the network comprises at least one of:
- the speed of the network;
- the current bandwidth capacity of the network;
- a projected bandwidth capacity for the network.

14. The system of claim 11, wherein the property of the primary storage system comprises at least one of:
- the current storage capacity of the primary storage system;
- a projected storage capacity for the primary storage system;
- the current I/O load on the primary storage system;
- a projected I/O load for the primary storage system.

15. The system of claim 9, wherein the plurality of different recall modes comprise:
- the full recall mode;
- the partial recall mode;
- the pass-through recall mode.

16. The system of claim 9, wherein the primary storage system and the secondary storage system comprise portions of at least one of:
- a data-archiving system;
- a hierarchical storage management system.

17. A non-transitory computer-readable-storage medium comprising computer-executable instructions that, when executed by at least one processor of a computing device, cause the computing device to:
- intercept a request to recall a file from a secondary storage system to a primary storage system;
- identify a value of at least one dynamic environmental property associated with the file that may negatively impact performance of at least one mode of recalling the file from the secondary storage system to the primary storage system by negatively impacting at least one of:
  - load on the primary storage system;
  - load on the secondary storage system;
  - network load on a network through which the file will be recalled;
- identify at least one policy that comprises criteria for selecting, from among a plurality of different recall modes based on the value of the dynamic environmental property, an appropriate recall mode for recalling the file from the secondary storage system to the primary storage system, the plurality of different recall modes comprising at least two of:
  - a full recall mode;
  - a partial recall mode;
  - a pass-through recall mode;
- adaptively select, at least in part by applying the policy to the value of the dynamic environmental property, a recall mode for recalling the file from the secondary storage system to the primary storage system;
- recall the file from the secondary storage system to the primary storage system using the selected recall mode.

18. The computer-readable-storage medium of claim 17, wherein the value of the dynamic environmental property comprises a projected value of the dynamic environmental property.

19. The computer-readable-storage medium of claim 17, wherein the dynamic environmental property associated with the file comprises at least one of:
- a property of the file;
- a property of the primary storage system;
- a property of the secondary storage system;
- a property of the network through which the file will be recalled.

20. The computer-readable-storage medium of claim 17, wherein the plurality of different recall modes comprise:
- the full recall mode;
- the partial recall mode;
- the pass-through recall mode.

* * * * *